United States Patent Office 3,484,960
Patented Dec. 23, 1969

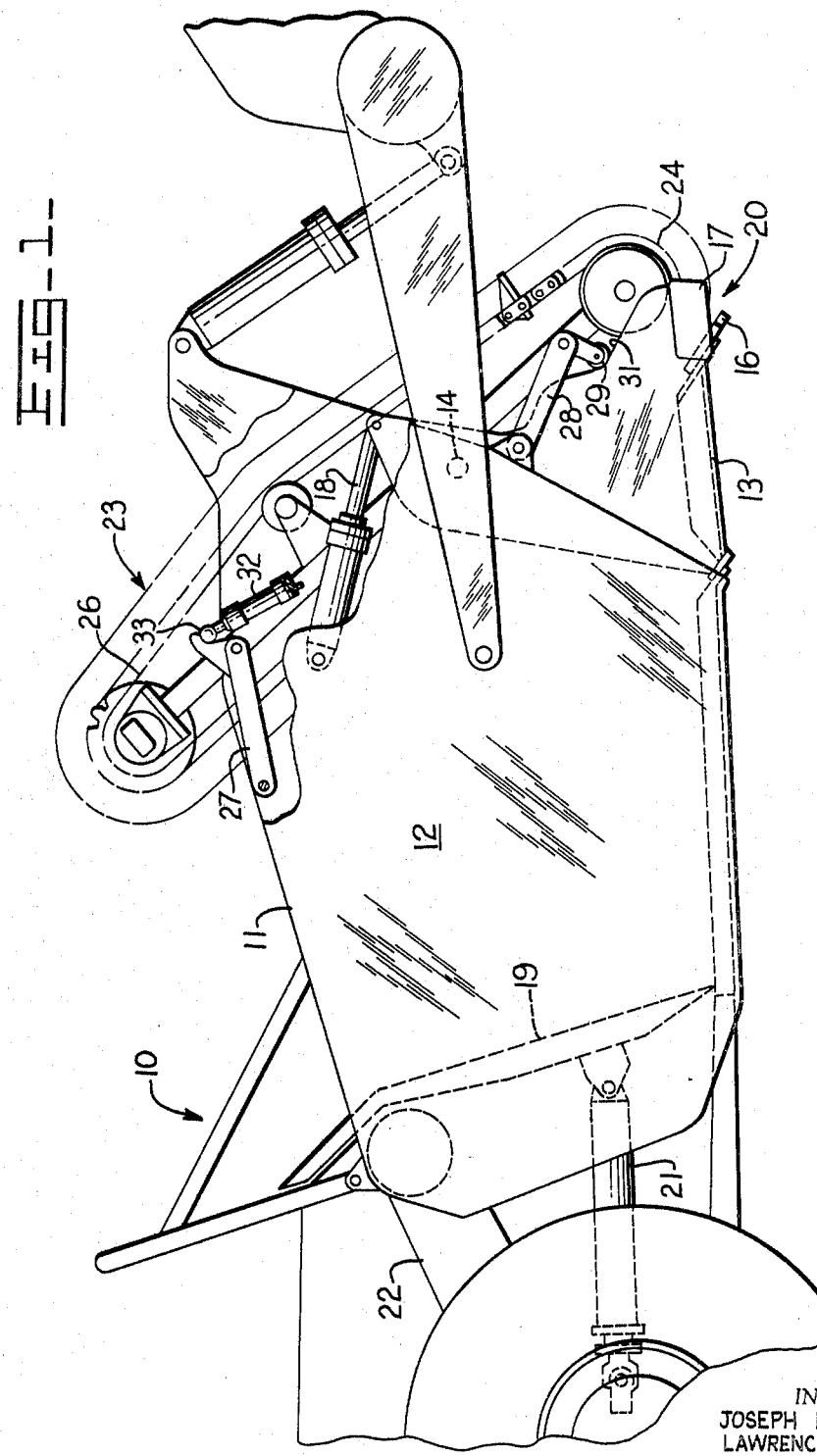

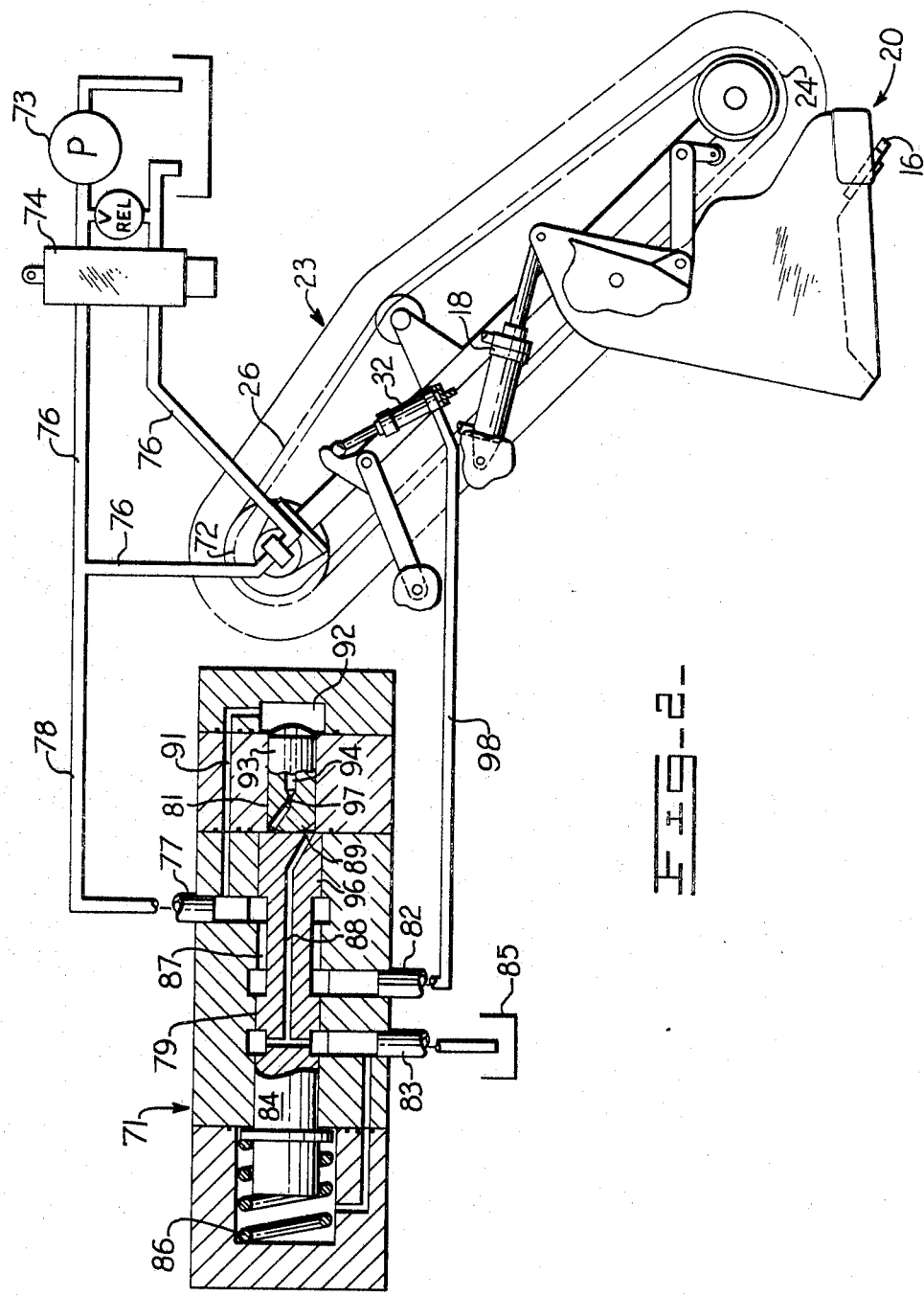

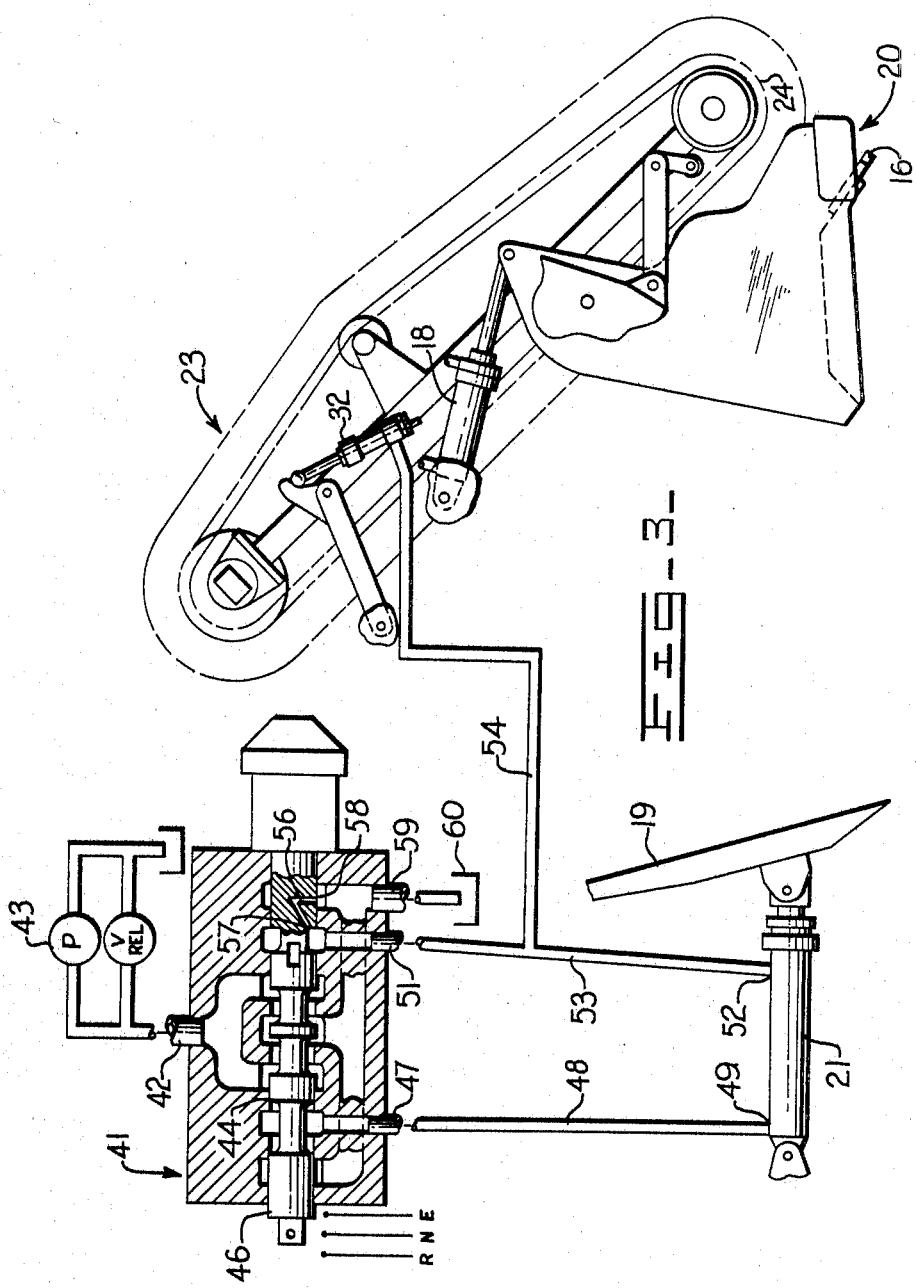

3,484,960
APPARATUS FOR CONTROLLING THE POSITION OF THE ELEVATOR IN A SELF-LOADING ELEVATOR SCRAPER
Joseph Kokaly, Phoenix, Ariz., and Lawrence J. Miller, Joliet, Ill., assignors to Sandvikens Jernverks Aktiebolag, Sandviken, Sweden, a corporation of Sweden
Filed Aug. 31, 1967, Ser. No. 664,755
Int. Cl. E02f 3/62, 3/84
U.S. Cl. 37—8                          3 Claims

ABSTRACT OF THE DISCLOSURE

Apparatus is provided for increasing the loading rate of an elevator scraper having a main bowl, an auxiliary bowl with a cutting blade at the forward open end of the main bowl and an elevator pivotally connected to have its forward end adjacent the cutting blade to assist in loading earth into the bowl. A pair of hydraulic jacks is disposed between the elevator and the scraper to separately control the pivoted position of the elevator. The jacks are retracted to raise the forward end of the elevator away from the cutting blade to permit unobstructed passage of earth therebetween and into the bowl during the initial loading of the scraper. The jacks are extended a predetermined interval of time after commencement of the loading operation to lower the elevator into its usual position relative to the cutting blade to assist in subsequent loading of the scraper.

BACKGROUND OF THE INVENTION

Earthmoving elevator scrapers include an elevator to assist in the loading of earth or other material into the scraper bowl and to decrease the tractive power required during the loading operation. Other scrapers, usually provided with greater tractive power by all-wheel drive means, do not have an elevator but depend upon the tractive power of the scraper tractor, and possibly that of a pusher tractor, to move material from the cutting blade into the scraper bowl. This type of scraper is relatively deficient in that considerable tractive power is required during the latter portion of the loading cycle to continue cutting and also to move material into the scraper bowl. In the elevator scrapers, power required during the latter portion of the loading cycle is reduced by the action of the elevator moving material from the cutting blade into the scraper bowl. However, during the initial portion of the loading cycle, the same elevator, being disposed near the cutting edge, reduces the open area between the cutting edge and elevator, through which material passes into the scraper bowl. Thus, the elevator scrapers have a relatively poor rate of loading during the initial portion of the loading cycle.

SUMMARY OF THE INVENTION

The present invention provides a method and apparatus for improving the over-all loading rate of an elevator scraper having a cutting blade over which material passes into the scraper bowl and an elevator pivotably disposed generally above the cutting blade. Control means are connected with the elevator for separately controlling its pivoted position. The above-noted method comprises the steps of operating the control means to raise the elevator away from the cutting blade during initial loading of the scraper and operating the control means a preselected interval of time after commencement of the loading operation to return the elevator to its normal position relative to the cutting blade to assist in subsequent loading of the scraper.

BRIEF DESCRIPTION OF THE DRAWINGS

FIG. 1 is a partial view in elevation of an elevator scraper including hydraulic jacks for controlling the elevator position;

FIG. 2 is a schematic illustration of apparatus for automatically operating the elevator positioning jacks of FIG. 1; and FIG. 3 is a schematic illustration of alternate apparatus for automatically operating the elevator positioning jacks of FIG. 1.

DESCRIPTION OF THE PREFERRED EMBODIMENTS

With reference to FIG. 1, an elevator scraper 10, preferably of a type provided with all-wheel-drive means (not shown), comprises a main scraper bowl 11 having two sidewalls 12 (one of which is shown). To permit unloading of the main bowl, an auxiliary bowl 13 is disposed at the front open end of the main bowl 11 and is pivotally connected to the main bowl sidewalls by pivot means 14. A cutting blade 16 is disposed along the leading edge 17 of the auxiliary bowl. A pair of hydraulic jacks, one of which is shown at 18, are pivotally connected between the main bowl sidewalls and the auxiliary bowl and operate to pivot the auxiliary bowl forwardly to provide an opening between the auxiliary bowl and main bowl for unloading and to return the auxiliary bowl to its usual position for loading.

An ejector plate 19 is disposed at the rear of the main scraper bowl, and a double-acting hydraulic jack 21, connected between the elevator scraper frame 22 and the ejector, extends to cause the ejector to traverse and unload the scraper bowl in the normal manner for scrapers of this type.

To assist in loading the main scraper bowl, an elevator 23 is disposed in the forward open end of the main bowl so as to be inclined forwardly and downwardly and have an end 24 adjacent to the cutting edge. A continuous elevating flight track 26 forms part of the elevator and is operable in clockwise rotation about the elevator to assist in moving material into the main scraper bowl. The elevator is separately connected to each main scraper bowl sidewall by an upper and a lower pivotable support link 27 and 28 respectively (only one of each of which is shown). Each lower support link includes a roller 29 which rides on a cam surface 31 provided by each auxiliary bowl sidewall. By this arrangement, the elevator is raised and lowered along with the auxiliary bowl in response to operation of the hydraulic jacks 18.

An elevator position control means 32 is disposed with relation to the elevator to raise and lower the forward end 24 of the elevator with respect to the cutting edge and the auxiliary bowl. Preferably, the elevator position control means 32 comprises a pair of single-acting hydraulic jacks 32 (only one of which is shown) disposed between the main bowl sidewalls and a projection 33 of each upper support link 27 such that extension of the hydraulic jacks 32 raises the forward elevator end 24. Upon release of hydraulic fluid pressure in the jacks, the weight of the elevator causes retraction of the jacks and lowering of the elevator end 24.

In the method of loading taught by the present invention, the hydraulic jacks 32 are extended to raise the forward end of the elevator during the initial portion of the loading cycle. A throat region, indicated at 20, between the cutting edge and the forward elevator end, is thereby enlarged to permit substantially unobstructed passage of material therethrough and into the scraper bowl 11. After the initial portion of the cycle, e.g. two or three tenths of a minute, the forward elevator end is lowered into its usual position relative to the cutting blade to assist in subsequent loading of material into the main bowl. To simplify the operation of the invention, the lowering of the elevator may be accomplished by any suitable delay means. However, as described hereinbelow, a preferred delay means comprises a restricting orifice in communication with the jacks controlling the elevator position.

It is to be noted that the above method of operation permits a significant reduction in loading time over the usual method of operating elevator scrapers. More particularly, when the elevator mechanism remains lowered through the entire loading operation the initial loading rate is low due to the partial blocking of the scraper throat region and thus the limiting of the amount of material which can pass therebetween into the scraper bowl. By comparison, the method of operation taught by the present invention reduces elevator scraper loading time by as much as 15–20%, depending upon the type of material being loaded.

To reduce the manipulative duties of the elevator scraper operator, automatic regulating means are provided to control the hydraulic jacks 32. Referring to FIG. 3, high pressure hydraulic fluid is introduced into an inlet port 42 of an ejector control valve 41 from a hydraulic pump 43. Inlet port 42 communicates with a valve bore 44 in which an ejector valve spool 46 is slidably disposed. The spool has a plurality of annular slots and internal passages defined therein and may assume a longitudinal position in bore 44 corresponding to eject, indicated by E at the control end of the spool, wherein hydraulic fluid passes only through the inlet port 42, bore 44 and eject port 47 of the valve and a conduit 48 which communicated port 47 with the head end 49 of hydraulic jack 21. Fluid flow through the valve, in eject position, causes extension of hydraulic jack 21 and unloading operation of the ejector results. The ejector spool also has a return position in the spool bore, indicated at R, wherein operating hydraulic fluid from pump 43 passes from the inlet port 42 through bore 44 to the return outlet port 51 which is in communication with the rod end 52 of hydraulic jack 21 by means of a conduit 53. With the spool in the return position, hydraulic fluid causes the jack 21 to retract and return ejector plate to its normal position. The ejector spool 46 tends toward a neutral position indicated at N, where operating hydraulic fluid from the inlet port 42 is prevented from entering either the eject outlet port 47 or return operation of the ejector plate.

To regulate the hydraulic jacks 32 such that the forward end of the elevator is lowered at a preselected interval of time after commencing loading, a restricting orifice 56 is defined by the spool 46 to be in fluid communication with the hydraulic jacks 32 by means of the conduit 54 and the control valve return outlet port 51. Restricting orifice 56 has an upstream, or high pressure, end 57 in communication with the port 51 and a downstream, or low pressure, end 58 communicating with a hydraulic fluid relief port 59 from which hydraulic fluid drains to a tank 60.

When a first loading cycle is completed, the elevator scraper operator moves the ejector spool to its eject position to cause the ejector plate to unload the scraper bowl. When the unloading of the scraper bowl is completed and a new loading cycle is to be commenced, the operator moves the ejector spool to its return position whereby the ejector plate is returned to the rear of the bowl. While the spool is in the return position, hydraulic fluid passing from the inlet port 42 to the port 51 is also communicated to the hydraulic jacks 32 by means of the conduits 54 as described above. The hydraulic jacks 32 are thereby extended, raising the forward elevator end at the commencement of the subsequent loading cycle. After the ejector plate is so returned, the ejector spool is placed in its neutral position, and the high pressure hydraulic fluid in the hydraulic jacks 32 and conduits 54 passes through the restricting orifice 56 to drain 60. As the hydraulic fluid pressure in the jacks 32 decreases, the weight of the elevator causes retraction of the jacks and lowering of the forward elevator end. The size and configuration of the restricting orifice is selected such that the elevator is fully lowered only after the above-noted preselected interval of time following commencement of the loading cycle.

It is to be noted that the restricting orifice 56 would serve equally well if its high-pressure end 57 were in direct communication with either the conduits 54 or the hydraulic jacks 32.

Having reference to FIG. 2 as well as FIG. 1, the above-noted control regulating means is alternately embodied in a valve 71 associated with a hydraulic motor 72 which drives the elevator. When a new loading cycle is to be commenced, the operator releases high pressure hydraulic fluid from a motor supply pump 73, by means of a valve 74, to pass through a communicating conduit 76 and operate the hydraulic motor. Hydraulic fluid is also directed to an inlet port 77 of the valve 71 by means of a connecting conduit 78. The valve housing 71 has a valve bore 79 with which the inlet port 77 communicates, and a smaller piston bore 81 axially aligned with and abutting one end of the valve bore 79. The valve housing 71 also has an outlet port 82 and a relief port 83 each in communication with the bore 79. The relief port 83 provides hydraulic fluid communication to a drain tank 85. The spool 84 is slidably disposed for axial motion in spool bore 79 while a spring 86 at one end of the bore urges the spool 84 toward the piston bore. The spool 84 defines an annular recess 87 which communicates with the inlet port 77 and outlet port 82 when the spool is spring driven to abut the shoulder of the piston bore. When the spool is urged leftwardly against the spring, an annular recess 87 provides fluid communication between the outlet port 82 and the relief port 83. An internal passage 88 in the spool 84 restrictedly communicates the spool end 89, adjacent the piston chamber, with the relief port 83 when the spool is spring driven rightwardly. An internal passage 91 in the valve 71 provides fluid communication between the valve inlet port 77 and an enlarged piston chamber 92 defined by valve 71 adjacent the piston bore and distal the spool bore. A piston 93, having generally spherically shaped ends 96, is slidably disposed for axial motion in the piston bore. An internal passage 94 in the piston provides fluid communication between the enlarged piston chamber 92 and a peripheral portion of an end 96 of the piston adjacent the spool bore. A restricting orifice 97 is internally defined by the piston 93 across the internal piston passage 94.

When the valve 74 is opened to operate the elevator at the beginning of a loading cycle, hydraulic fluid passes through the conduit 78, valve inlet port 77, annular spool recess 87, outlet port 82 and conduit 98 into the hydraulic jacks 32, thereby causing them to extend and raise the elevator end 24. This initial hydraulic fluid pressure is communicated to the piston chamber 92 by the valve passage 91 and acts against the cross-sectional area of piston 93 but is insufficient to overcome spring 86. Initial hydraulic fluid pressure increases or surges passing through orifice 97 are prevented by the spool channel 88 from acting against the larger cross-sectional area of spool 84 to shift the spool to the left in the following manner. Initial hydraulic fluid passing through the orifice 97 and massing between the piston and spool is drained off through the internal spool channel 88 and the relief port 83 which is aligned therewith while the spool is spring-driven against the shoulder of the piston bore.

However, as loading of the scraper bowl proceeds, loaded material passing through the scraper throat piles up and is acted upon by flight tracks 26 of the elevator. This interaction of the elevator with the loaded material places a load on the hydraulic motor 72 and causes increased back pressure in the hydraulic fluid conduits 76 and 78. This increased fluid pressure acts against the piston 93 by means of the passage 91 to cause a partial movement of the piston and spool against spring 86 such that the spool recess 87 is in fluid communication with neither the inlet port 77 nor the outlet port 82 and the internal spool channel 88 is moved out of alignment with relief port 83. Fluid passing through the orifice 97 cannot drain through the channel 88 and thus builds up pressure against the relatively larger cross-sectional area of the spool. When sufficient hydraulic pressure is transmitter through the restricting orifice 97 and acts against the cross-sectional area of the spool, the spring is overcome and the spool is completely shifted to the left. The spool recess 87 then provides fluid communication between the valve outlet port 82 and valve release port 83 such that hydraulic fluid is drained from the jacks 32. The weight of the elevator then causes the jacks to retract and the forward elevator end is lowered into its desired spatial relation with the cutting edge.

In the above operation, the internal spool channel 88 provides for a differential shifting pressure in that initial back pressure building up in the conduit 78, channel 91 and piston chamber end 92 can act only against the smaller cross-sectional area of the piston. However, once there is sufficient hydraulic pressure to partially shift the spool and piston to the left, the channel 88 is out of communication with the relief port 83. Hyrdaulic pressure passing through the orifice 97 builds up against the larger cross-sectional area of the spool. Thereafter, less hydraulic pressure is required to completely shift the spool to the left and/or maintain it there. Thus, small pressure variations will not cause fluttering of the spool and piston.

By the above operation, the forward elevator end is lowered at a preselected interval of time following commencement of scraper loading. That preselected interval of time depends upon the rate at which loaded material builds up against the elevator and the corresponding pressure increase of hydraulic fluid provided to the valve 71, the valve component and passage sizings, and the compressive strength of the spring 86.

Further, such a preselected interval of time could alternately be made dependent upon a careful selection of the compressive strength of the spring 86 and component sizing of the valve 71 even in the absence of the piston and, accordingly, without the restricting orifice.

What is claimed is:

1. In an elevator scraper having a main bowl open at its forward end, a cutting blade disposed at the forward end of the bowl and an elevator pivotally connected to the scraper to have its forward end normally disposed generally above and forward of the cutting blade to assist in the loading of material passing over the cutting blade into the bowl, the improvement comprising:
control means disposed with relation to the elevator for controlling pivotal motion of the elevator independently from motion of the cutting blade and to raise the forward end of the elevator away from the cutting blade when a loading cycle of the scraper is commenced, said control means including a single-acting hydraulic jack which extends to raise the elevator; and means operatively associated with said control means to automatically regulate said control means to lower the elevator at a preselected interval of time after the commencement of a loading cycle of the scraper, the forward end of the elevator to then be positioned relative to the cutting blade to assist in loading material into the scraper bowl, said automatic means comprising a restricting orifice means having an upstream high pressure side and a downstream low pressure side, said orifice means being movable between an active and inactive position, said destrictive orifice means hydraulically communicating to drain the jack, said orifice means being selectively sized to substantially reduce the rate of fluid drainage from the jack to regulate the preselected interval of time after which the jack retracts to lower the elevator into its normal position relative to the cutting blade.

2. An improved scraper according to claim 1 where the scraper has an auxiliary bowl disposed forward of the main bowl and pivotable forwardly to provide an opening therebetween for unloading of material from the main bowl, the cutting blade being disposed at a forward open end of the auxiliary bowl, an ejector disposed to traverse the bowl toward the cutting blade to eject loaded material therefrom and then be returned to its original position to commence a new loading cycle and a double-acting hydraulic ejector jack operable to extend and cause ejector unloading traversal of the scraper bowl and to retract and return the ejector to its usual loading position and further comprising:
a high pressure hydraulic fluid source;
a valve housing having a spool bore, an inlet port communicating said fluid source with said spool bore, an eject port communicating said spool bore with a head end of the ejector jack and a return port communicating said spool bore with a rod end of the ejector jack and said elevator control jack;
an ejector spool slidably disposed in said valve spool bore and longitudinally operable therein between a first eject position permitting hydraulic fluid communication between said valve inlet port and said eject port, a second return position permitting hydraulic fluid flow communication between said valve inlet port and said return port and a neutral position preventing hydraulic fluid flow from said fluid source; and
said restricting orifice being defined by said ejector spool to have its upstream side in fluid communication with said elevator control hydraulic jack.

3. An improved scraper according to claim 1 wherein the elevator scraper includes hydraulically driven power means for operating the elevator and further comprising:
a hydraulic fluid source operable to provide hydraulic fluid to the elevator power means at fluid pressures according to the load on the elevator;
a valve housing defining a cylindrical spool bore, a smaller piston bore, axially aligned at one end thereof, an inlet port communicating between said fluid source and said spool bore, an outlet port communicating between said spool bore and said elevator control jack, a relief port communicating between the spool bore and a passage communicating between said inlet port and an end of said piston bore distal said spool bore;
a cylindrical spool disposed in the spool bore to be longitudinally slidable therein and having spring means tending to move said spool toward the piston bore, said spool defining an annular recess therein communicating between the inlet port and the outlet port when said spool abuts the piston chamber, the annular spool communicating between said outlet port and said relief port when said spool is moved against said spring, said spool defining an internal restricting passage providing fluid communicating between the spool end adjacent the piston chamber and the relief port when said spool abuts the piston chamber;
a cylindrical piston, of smaller cross-sectional area than said spool, slidably disposed in said piston chamber to act against said spring-loaded spool, said piston defining a generally axial passage therethrough; and said restricting orifice means being defined by said piston to be across said axial piston passage to have its downstream side in communication with said spool bore.

References Cited

UNITED STATES PATENTS

| | | | |
|---|---|---|---|
| 2,956,353 | 10/1960 | Hanner et al. | 37—8 |
| 3,331,149 | 7/1967 | Rapp | 37—8 |
| 3,343,286 | 9/1967 | Ray et al. | 37—8 |
| 3,321,094 | 5/1967 | Shore | 37—8 |
| 3,386,344 | 6/1968 | Junck et al. | 91—414 |

ROBERT E. PULFREY, Primary Examiner

EUGENE H. EICKHOLT, Assistant Examiner

U.S. Cl. X.R.

37—129

PO-1050
(5/69)

UNITED STATES PATENT OFFICE
CERTIFICATE OF CORRECTION

Patent No. __3,484,960__    Dated __December 23, 1969__

Inventor(s) __Joseph Kokaly, et al__

It is certified that error appears in the above-identified patent and that said Letters Patent are hereby corrected as shown below:

Column 1, lines 6 and 7, delete "assignors to Sandvikens Jernverks Aktiebolag, Sandviken, Sweden, a corporation of Sweden" and insert --assignors to Caterpillar Tractor Co., Peoria, Ill., a corporation of California.--

Column 6, line 7, (claim 1) "destrictive" should be --restrict

Column 6, line 44, (claim 2) "means" omitted after --orifice-

SIGNED AND
SEALED
JUN 23 1970

(SEAL)
Attest:

Edward M. Fletcher, Jr.
Attesting Officer

WILLIAM E. SCHUYLER, JR.
Commissioner of Patents